United States Patent
Sanduja et al.

(10) Patent No.: US 6,943,218 B1
(45) Date of Patent: Sep. 13, 2005

(54) POLYOLEFINS WITH FLAME RETARDANCY AND ABRASION RESISTANCE ADDITIVES

(75) Inventors: Mohan L. Sanduja, Brooklyn, NY (US); Paul Thottathil, Brooklyn, NY (US)

(73) Assignee: Westgate Capital Company, L.L.C., Tulsa, OK (US)

( * ) Notice: Subject to any disclaimer, the term of this patent is extended or adjusted under 35 U.S.C. 154(b) by 98 days.

(21) Appl. No.: 10/152,418

(22) Filed: May 21, 2002

(51) Int. Cl.$^7$ .............................................. C08F 255/02
(52) U.S. Cl. ...................................................... 525/288
(58) Field of Search ................................ 525/288, 242; 524/500, 504

(56) References Cited

U.S. PATENT DOCUMENTS

| | | | |
|---|---|---|---|
| 3,925,275 A | 12/1975 | Musashi et al. | 260/17.4 |
| 4,230,049 A | 10/1980 | Horne | 108/51.1 |
| 4,397,246 A | 8/1983 | Ishida et al. | 108/55.3 |
| 4,467,728 A | 8/1984 | Horne | 108/51.1 |
| 4,801,639 A * | 1/1989 | Hoshi et al. | 524/112 |
| 4,875,410 A | 10/1989 | Lee et al. | 101/170 |
| 5,165,990 A | 11/1992 | Nakano | 428/288 |
| 5,492,741 A | 2/1996 | Akao et al. | 428/35.2 |
| 5,494,718 A | 2/1996 | Adams et al. | 428/35.7 |
| 5,834,535 A | 11/1998 | Abu-Isa et al. | 523/179 |
| 6,156,842 A | 12/2000 | Hoenig et al. | 525/171 |
| 6,228,912 B1 | 5/2001 | Campbell et al. | 524/100 |
| 6,281,275 B1 | 8/2001 | Sanduja et al. | 524/401 |
| 6,328,985 B1 | 12/2001 | Sanduja et al. | 424/404 |
| 6,329,450 B1 | 12/2001 | Ogoe et al. | 524/35 |
| 6,344,508 B1 | 2/2002 | Endo et al. | 524/313 |
| 6,783,865 B2 * | 8/2004 | Sanduja et al. | 428/523 |
| 2001/0031807 A1 | 10/2001 | Adedeji et al. | 524/127 |
| 2002/0019466 A1 | 2/2002 | Falcone et al. | 524/100 |

* cited by examiner

Primary Examiner—Jeffrey Mullis
(74) Attorney, Agent, or Firm—Head, Johnson & Kachigian

(57) ABSTRACT

A chemical composition and method for the production of polyolefins having enhanced flame retardancy and abrasion resistance properties. Additives are covalently bound to substrate polymers by means of a graft polymerization process. Chemical grafting is facilitated by a novel mixture of graft initiating catalyst and substrate monomers.

1 Claim, 2 Drawing Sheets

POLYOLEFINS WITH FLAME RETARDANCY AND ABRASION RESISTANCE ADDITIVES

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING A TABLE, OR A COMPUTER PROGRAM LISTING COMPACT DISC APPENDIX

Not applicable.

BACKGROUND OF THE INVENTION

1. Field of the Invention

The present invention relates to polyolefins having an additive that gives it flame retardant and abrasion resistance properties. More specifically, the present invention relates to a method for chemically grafting polymers having flame retardancy and abrasion resistance additives incorporated into them to polyolefms such that they are covalently bound to the substrate polymer. The resulting material has superior mechanical, flame retardancy and abrasion resistance properties.

2. Prior Art

Polyolefins are synthetic organic thermoplastics that are composed of carbon and hydrogen and as such, are inherently flammable. Applications incorporating polyolefins, such as pallets, construction, transportation, electrical, home furnishings, toys, outdoor play equipment, industrial tanks, containers, materials handling equipment and housewares, demand compliance with mandatory flame retardancy requirements, thereby requiring the addition of flame retardant additives.

A variety of flame retardant additives have been developed specifically for treatment of polyolefins to hinder ignition and reduce flame spread so the polyolefin can meet the required flammability specifications. Typically, most additive type flame retardants are incompatible with the polymer matrix and lead to detrimental mechanical and physical effects which are demonstrated by an observable loss in physical property attributes, particularly impact strength. The usual result is a compromise between deteriorated physical properties and the desired enhancement of combustion resistance.

In flame retarding thermoplastics, the synergistic action between organohalogen compounds and metal oxides is well known. A wide variety of organic, halogenated compounds are used as additives in conjunction with metal oxides, especially those having metals of Groups III, IV, V and VI. Unfortunately, addition of these flame retardant compounds has a deleterious effect on mechanical and physical properties of polyolefins such as polyethylene and polypropylene.

Recently, there has been research into derivatives of polyethylene and polypropylene. These polyolefins may be modified so that they have various functional groups or organic molecules incorporated into them. These methods, however, have not yet produced materials having acceptable levels of flame retardancy. In addition, these modifications to the polyolefins require several additional processing steps. This increases the time, difficulty and expense of the end product.

Adedeji et al. (Publication No. US 2001/0031807) to General Electric, discloses plastic pallets of resins such as polyphenylene or polycarbonate resin. It is also suggested that a commercially available flame retardant agent may be added to the composition. The pallets are said to meet the UL2335 protocol.

Falcone et al. (Publication No. US 202/0019466) discloses phosphoramides and mixtures thereof with thermoplastic resins which might further include halogen-containing flame retardants such as brominated flame retardants. It does not disclose polyolefins having graft polymers with incorporated flame retardants.

Horne (U.S. Pat. No. 4,230,049) discloses pallets and platforms comprised of composites formed of cellulose fibers reinforced with cross-linked polyethylene or polypropylene.

Ishida et al. (U.S. Pat. No. 4,397,246) discloses synthetic pallets composed of resins such as polyethylenes or polypropylenes.

Horne (U.S. Pat. No. 4,467,728) discloses a composite structural material which includes a starting polymer of polyethylene. It does not disclose polyolefins having graft polymers with incorporated flame retardants.

Campbell et al. (U.S. Pat. No. 6,228,912) discloses resin compositions such as polyethylene and polypropylene which may include flame retardants such as those including bromine. It does not disclose polyolefins having graft polymers with incorporated flame retardants.

To date there is no ideal flame retardant commercially available. They all have detrimental effects on the physical properties of the polymer they are incorporated in. It would, therefore, be desirable to provide a highly flame retardant, impact resistant and abrasion resistant polyolefin as well as a method for imparting flame retardance and improved impact resistance to polyolefin compositions in which the additives are uniformly dispersed throughout the composition.

BRIEF SUMMARY OF THE INVENTION

The present invention overcomes the difficulties found in the prior art by providing an additive composition that increases the flame retardancy and abrasion resistance of polyolefins without substantially detrimentally affecting the mechanical and physical properties of the end product material. This is accomplished by utilizing a polymer technology known as "grafting". Grafting allows the covalent binding of various materials to a substrate polymer. In the present invention, these side chains, or graft polymers, that are grafted onto the substrate polymer have flame retardant and abrasion resistant compounds incorporated into them. By chemically linking the flame retardant and abrasion resistant additives to the polyolefin, the mechanical and physical properties of the polymer are retained.

By forming chemical bonds between the additive and the substrate polymer, other advantages are obtained. Those skilled in the art will appreciate that chemical "leaching" has a deleterious effect on polymer compositions. Flame retardant and abrasion resistant additives that are simply mixed into a polymer composition may be leached out of the material, thus reducing the flame retardancy and abrasion resistance of the material. However, in the present invention, the flame retardant and abrasion resistant additives are chemically bound to the polymer. Because the chemical grafting technique disclosed herein creates covalent bonds between the substrate polymer and the additives, they essentially become part of the same macromolecule. Leaching is, therefore, not possible in the present invention. Those skilled in the art will appreciate that this is a significant advantage over the prior art.

Another significant advantage of the present invention is that no additional steps need be added to the manufacturing process. The covalent linkages between the additives and the substrate polymer are formed during the thermoplastic molding step that is a standard part of production of plastic materials. The additive composition may be added just prior to the thermoplastic molding. The heat of the molding step alone is sufficient to initiate and carry to completion the grafting reaction.

The present invention is especially suitable for forming plastic pallets. It is also suitable for a variety of other products including wire and cable coatings, plastic pipe, molded automotive and machine parts, electronic appliance parts, plastic coatings and film, boxes and other packaging materials. Those skilled in the art will appreciate that the present invention is suitable for any purpose for which polyolefins are suitable.

Organic halogenated compounds are used for the composition of the present invention. In addition, metal oxides known to act synergistically with organic halogenated compounds to increase a polymer's flame retardancy are also added to the composition. Although it is well known to add these compounds to polyolefins in order to increase their flame retardancy, the present invention is the first to disclose a method of chemically grafting these additives onto a substrate polymer. The prior art only discloses the addition of these chemicals to polyolefins without the formation of chemical bonds between these compounds and the polymer. It is this lack of a chemical linkage that reduces the mechanical and physical properties of the end product and allows leaching to occur. The present invention's use of covalent bonds to chemically graft these flame retardant compounds onto the polymer overcomes these deficiencies.

In order to facilitate chemical bonding between the flame retardant compounds and a polyolefin, cross linking monomers and a graft initiator are added to the composition. Further, a peroxide is added to facilitate regeneration of the graft initiator.

The present invention is especially well suited for increasing the flame retardancy and abrasion resistance of polyethylene and polypropylene, including high density polyethylene. The graft initiating ion operates by removing a more active or volatile hydrogen on the polymer in order to form a free radical. Those skilled in the art will appreciate that various molecular configurations cause certain hydrogens in a molecule to more easily dissociated. An example is the tertiary hydrogen of propylene. Once the hydrogen is removed, the free radical formed may then react with various monomers. These monomers then begin a graft polymerization initiating at the free radical. The monomers used have special functional groups attached to them. These functional groups bind to the flame retardant and abrasion resistant additives. The heat applied to the mixture during the curing step induces both graft polymerization and binding of additives to monomers simultaneously. While the present invention is especially suited for a polypropylene and polyethylene, those skilled in the art will appreciate that any polyolefin will be suitable for use in the present invention so long as they have active hydrogens that are readily dissociated by the action of a graft initiator. A significant advantage of the present invention is the utilization of these active hydrogens. Prior art polymer grafting generally required an oxygen or other more active component of the substrate polymer. The present invention only requires a somewhat volatile hydrogen on the substrate polymer. This innovation has not been expected from the prior art.

A number of metal ions are suitable for use as a graft initiator. Iron, silver, cobalt, copper, cesium and zinc ions may all be used to initiate grafting to a substrate polymer. In this particular invention, zinc is the preferred metal. However, those skilled in the art will appreciate that the best graft initiator depends on a variety of factors including, but not limited to, the substrate polymer, the monomers being grafted, the pH, temperature and other factors known to those skilled in the art.

The present invention is especially well suited for use in making plastic pallets for transporting goods. Pallets allow forklifts and other machinery to easily lift and transport stacks of materials. Currently, pallets are predominately formed from wood. In order to increase safety of storage, it would be highly advantageous to find a less flammable material for forming these pallets. The present invention discloses flame resistant pallets that are safer than wood. Wood is also far more susceptible to the elements, especially humidity, than plastic. It would be beneficial to the environment to reduce wood consumption as much as possible. In addition, wood prices have and will continue to increase. It is therefore desirable to utilize products such as the present invention to form pallets. Not only are they more flame retardant, resistant to the elements, less expensive and more environmentally friendly, but they also will last significantly longer.

DETAILED DESCRIPTION OF THE INVENTION

Figure 1:
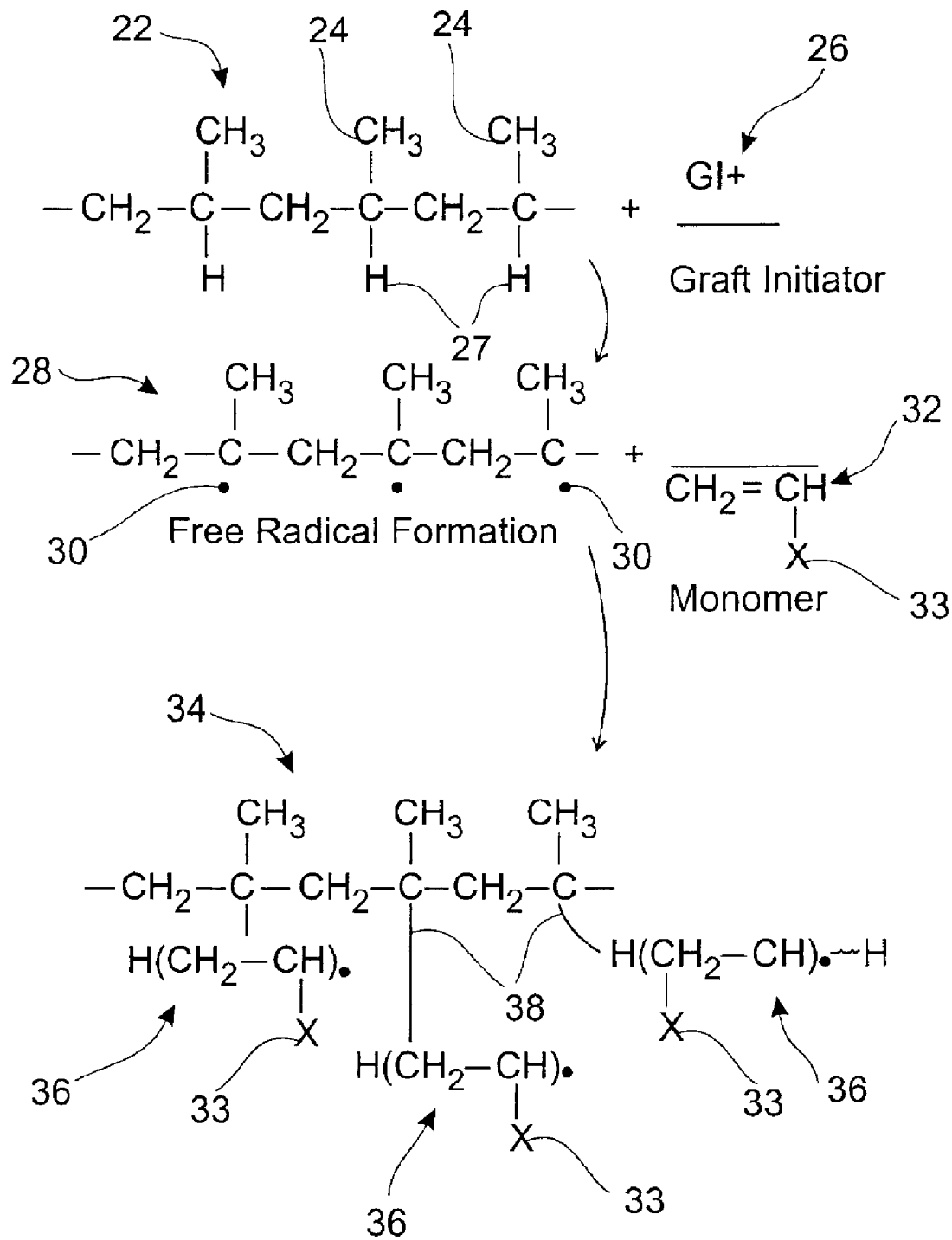
FIG. 1 is a diagrammatic illustration of the graft polymerization reaction.

In the present invention, the following terms are defined as described below:

"Chemical Grafting" or "grafting" refers to grafting as it is known in the art of polymer chemistry. Specifically, grafting refers to the covalent, chemical binding of monomers so as to form graft polymers on a substrate polymer. This is initiated by the removal of an active hydrogen in order to form a free radical on the substrate polymer backbone.

"Active Hydrogen" refers to a hydrogen atom on a substrate polymer that is more volatile, and thus more easily dissociated from the substrate polymer in order to form a free radical. Those skilled in the art will appreciate that the location of an active hydrogen depends on the chemical structure of the substrate polymer.

"Graft Initiators" refer to ions, especially metal ions, capable of causing an active hydrogen to dissociate from a substrate polymer, thus forming a free radical on the substrate polymer. In the present invention, zinc ions are preferred graft initiators. However, those skilled in the art will appreciate that a variety of ions are suitable.

"Polyolefins" refers to polymers formed from alkene momoners. Resulting polymers have a hydrocarbon backbone having multiple active hydrogens. In the present invention, polyethylene and polypropylene are preferred. However, those skilled in the art will appreciate that the present invention is suitable for any polymers in the large family of polyolefins so long as the polymer has a sufficient number of active hydrogens. "Cross Linker" or "graft monomer" refers to any of a large variety of monomers known to be suitable for forming graft polymers on substrate polymers. They form the graft polymer chains and have functional groups suitable for binding to nucleophilic atoms in flame retardant compounds. suitable functional groups include, but not limited to, hydroxyl, carboxyl, epoxy, amide and amine anhydride groups. Vinyl monomers having these functional groups are especially suitable. The present invention prefers vinyl trialkoxysilanes and acrylate monomers. However, those skilled in the art will realize that a number of monomers are suitable.

"Flame Retardant" refers to a wide variety of chemicals known to those skilled in the art to increase flame retardancy of a polymer resin. In the present invention, the combination of antimony pentoxide and organic bromine compounds are preferred due to their known synergistic affect. However, those skilled in the art will appreciate that a number of polyphosphate and other compounds including other metal oxides and organic halogenated compounds are also suitable flame retardants.

"Graft Polymer," "side chain polymer" or "side chain" refers to polymers formed by graft monomers and attached to a substrate polymer at points where graft initiators have formed free radicals on the substrate polymer. These graft or side chain polymers are heteropolymers, meaning that they are comprised of more than one type of monomer. Graft polymers have flame retardants attached them by means of functional groups of nucleophilic substitution reactions.

"Graft Initiator Regenerators" refers to compounds capable of removing electrons from graft initiators, thereby allowing them to remove additional active hydrogens from the substrate polymers. Peroxides are suitable compounds. Benzoyl peroxide, methyl ketone peroxide, tert butyl hydroperoxide, hydrogen peroxide and amonium ferrous sulfate are all good graft initiator regenerators.

"Substrate Polymer" refers to a polymer onto which graft polymers are grafted. In the present invention, substrate polymers are polyolefins, especially polyethylene and polypropylene. In the present invention, the method known as chemical grafting is used to covalently bind known flame retardant and abrasion resistant molecules to a polyolefin. In the existing art it is only known to physically add these flame retardant compounds to a polymer material without any grafting or chemical linking. This has a deleterious effect on the mechanical and physical properties of the final product. In addition, it allows for the leaching, or removal of, the flame retardant additives. This results in the final product eventually having none of the added flame retardant characteristics. By chemically bonding the flame retardant compounds to the substrate polymer by chemical grafting, the physical and mechanical properties of the polymer are retained. Chemical grafting also prevents the leaching away of the flame retardant compounds. Those skilled in the art will appreciate that this presents a significant advancement in the enhancement of flame retardant properties of polyolefins.

FIG. 1 shows the basic mechanism behind chemical grafting of polyolefins. In this embodiment, substrate polymer 22 is polypropylene. Those skilled in the art will realize that by replacing methyl groups 24 with hydrogen atoms, the substrate polymer would be polyethylene. The reaction mechanism for these polyolefins is the same. By adding graft initiator 26 and applying heat to the mixture, modified substrate polymer 28 is formed. In modified polymer 28, the active hydrogens 27 have been removed resulting in free radicals 30. Free radicals 30 have a negative charge and will react with graft monomer 32. In this embodiment, graft monomer 32 is a vinyl monomer. After reacting with graft monomer 32, modified substrate polymer 28 is transformed into grafted substrate polymer 34. Grafted substrate polymer 34 has graft polymers 36 covalently bound to it by covalent bonds 38. The length of graft polymers 36 may be controlled.

Graft monomer 32 has a functional group 33 attached. Those skilled in the art will recognize this as the structure of a vinyl monomer. Functional group 33 is often a halide. However, in the present invention, functional group 33 is one of several compounds to which a nucleophilic species is readily attached. As mentioned previously, these groups include, but are not limited to, hydroxyl, carboxyl, epoxy, amide, amine and hydride and tialkoxysilanes. Alkoxysilane and carboxyl are preferred functional groups. Flame retardant compounds having regions of strong negative charge, such as metal oxides and halogenated compounds, bind to these functional groups. Those skilled in the art will appreciate that one or more alkoxy moieties of an alkoxysilane may be replaced by a metal oxide or a halogenated compound. The flame retardant compound is then covalently bound to the silicon atom, which is in turn covalently bound to a vinyl group of the graft polymer. In this manner, flame retardant compounds are chemically bound to substrate polymers.

In the present invention, a zinc ion is utilized as a graft initiator. The unique electrophilic properties of a positive zinc ion allow it to efficiently remove an electron from active hydrogens on a substrate polyolefin. This in turn causes dissociation of the active hydrogen proton, resulting in a free radical. The free radical formed serves as a graft polymerization initiation cite. The use of a zinc ion as a graft initiator for substrate polyolefin polymers provides for faster, more efficient and more specific removal of active hydrogens and formation of free radicals. Although other metal ions listed above may be suitable, it is preferred in the present invention to use a zinc ion because of its electrophilic properties. In addition, zinc ions may be introduced into the reaction as zinc diacrylate. The acrylates introduced are incorporated into graft polymers so as to make them heteromeric. This increases the efficiency of the overall reaction and avoids introduction of unused ions into the reaction mixture.

The use of vinyl and acrylate graft monomers allows incorporation of flame retardants and abrasion resistant additives into the graft polymer. Vinyl trialkoxysilanes, especially vinyl trimethoxysilane and vinyl triethoxysilane, are especially well suited vinyl graft monomers for the present invention. The use of acrylate graft monomers in conjunction with vinyl graft monomers increases the amount of the flame retardant additives that are incorporated into the graft polymer side chains.

The flame retardant additives best suited for the present invention are halogenated organic compounds in conjunction with metal oxides. The organic halogenated compounds may be aromatic, aliphatic or cycloaliphatic. Chlorine, fluorine and bromine are preferred halogens. In this particular invention, brotninated organic compounds are used.

The synergistic effect between organohalogens and metal oxides is well known in the art. Therefore, the present invention also incorporates a metal oxide, specifically antimony pentoxide, into the graft polymers. Although brominated organic compounds and antimony pentoxide are utilized in the present invention, those skilled in the art will appreciate that there are a variety of other similar organohalogens and metal oxides that would be suitable in the present invention.

Amonium polyphosphate is also known to enhance flame retardants and abrasion resistance in some polyolefins. While it is beneficial to add amonium polyphosphate to polypropylene, its affect on polyethelyene is negligible. The oxygen atoms of the polyphosphate are nucleophilic in nature and are readily chemically bound to alcoxy silane and carboxyl moitinese. Therefore, they are suitable for the present invention.

TABLE I

| Formulation #21 Ingredients | Concentration Range Parts by Weight |
|---|---|
| 1. Polyolefin Antimony Pentoxide | 1.5–3.0 |
| 2. Polyethylene Antimony Pentoxide | 12–20 |
| 3. Polyolefin Aromatic Bromide | 2–4 |
| 4. Monomer Silane A151 | 0.08–0.15 |
| 5. Monomer Silane A171 | 0.08–0.15 |
| 6. Benzyl peroxide 0.1% in Toluene | 0.08–0.15 |
| 7. Zinc Acrylate SR633 | 0.008–0.015 |

Table 1 shows a formulation designed to graft flame retardant compounds onto polyethylene. Concentrations of each compound are expressed as parts by weight and are expressed in a range. The first ingredient is available under the tradename Burnex-2000-10 and is prepared and sold by Nyacol Industries. It is a mixture of polypropylene, antimony pentoxide and a brominated aromatic compound. Preferably, this ingredient is approximately 2 parts by weight of the total mixture. However, it may be included as anywhere from 1.5 to 3.0 parts by weight.

The second ingredient is available under the trade name Thermoguard 8218 and is supplied by Laurel Industries. It is a mixture of approximately 82% decabromodiphenyl oxide and 18% polyethylene. It is preferably 15 parts by weight of the mixture, but may be anywhere from 12 to 20 parts by weight of the mixture.

The third ingredient is available under the trade name Thermoguard 9010, and is a mixture of approximately 90% antimony oxide and 10% polyethylene and is also supplied by Laurel Industries. It is preferably 3 parts by weight of the mixture but may be anywhere from 2 to 4 parts by weight of the mixture.

These first 3 ingredients supply a metal oxide, specifically antimony pentoxide and antimony oxide, and organic brominated compounds. These compounds are known to have a synergistic, flame retardant effect on materials to which they are added. The present invention discloses the first method by which they may be incorporated into graft polymers.

The fourth ingredient is available under the tradename Silquest A-151 Silane and is supplied by Witco Corporation. It is primarily comprised of vinyltriethoxysilane. This monomer preferably comprises about 0.10 parts by weight of the mixture. However, it may be present as anywhere from 0.08 to 0.15 parts by weight of the mixture.

The fifth ingredient is available under the tradename Silquest A-171 Silane and is supplied by Crompton Corporation. It is comprised primarily of vinyl trimethoxysilane. This graft monomer is also preferably present as 0.10 parts by weight by mixture, but may range anywhere from 0.08 to 0.15 parts by weight.

These two silane vinyl monomers initiate and propagate polymerization of the graft polymer from a free radical formed on the substrate polymer. While the use of a mixture of different Silane vinyl monomers is preferred, the present invention also performs well when only one type of vinyl trialkoxy Silane is utilized as a graft monomer.

The sixth ingredient, benzoyl peroxide 0.1% in toluene may be obtained from Aldrich Chemical Company. It is preferably present as 0.10 parts by weight of the mixture, but may be anywhere from 0.08 to 0.15 parts by weight. This peroxide is present in order to regenerate the graft initiator. When the graft initiator removes an active hydrogen, it acquires an electron. Peroxide will then react with the graft initiator to remove the electron such that the graft initiator may remove another active hydrogen. This reaction cycles in order to constantly provide regenerated graft initiator. In this embodiment, benzoyl peroxide is used, however, those skilled in the art will appreciate that almost any peroxide molecule, including methyl ketone peroxide, tert butyl hydro peroxide, hydrogen peroxide and ammonium ferrous sulfate, will all be suitable graft initiator regenerators. Those skilled in the art will appreciate that these are only a few of the many compounds having mild oxidative properties that are suitable for removing an electron from a metal ion.

The seventh ingredient is available under the tradename SR 633 and is provided by Sartomer Company. This chemical is comprised primarily of zinc acrylate and any zinc acrylate is suitable for the present invention. It is preferably 0.01 parts by weight of the mixture. However, it may be anywhere from 0.008 to 0.015 parts by weight of the mixture. Those skilled in the art will appreciate that because this catalyst is readily regenerated, only a small concentration is require. The zinc ion in this ingredient serves as the graft initiator in the present invention. In addition, acrylate is incorporated as a monomer into the graft polymers. The use of zinc acrylate as a graft initiator is an important aspect of the present invention, as it allows the incorporation of the flame retardant compounds into the graft polymers.

The mixture shown in Table 1 is then added to approximately 80 parts by weight polyethylene. This amount may range anywhere from 70 to 90 parts by weight of polyethylene and 10 to 30 parts by weight of the graft mixture. The total mixture of polyethylene plus grafting mixture is then subjected either to molding or extrusion into a finished product. The molding for extrusion process results in a heating of the mixture. This heating is sufficient to induce and carry to completion the graft polymerization process as well as the attachment of flame retardant additives to the graft monomers. Those skilled in the art will appreciate the significant advantage of the simplicity of incorporating this process into normal polyethylene processing. No additional step need be added, making the incorporation of graft polymerization a simple matter.

A very similar graft mixture has been developed for use with polypropylene and is shown in Table 2. The amounts of the various ingredients are somewhat different, and vinyltrimethoxysilane has been replaced with ammonium polyphosphate. Ammonium polyphosphate is a known flame retardant and further enhances the flame retardancy of the final product. It is not included in the mixture for polyethylene because it has not been found to significantly enhance the flame retardancy of the final product.

TABLE II

| Formulation #35 Ingredients | Concentration Range Parts by Weight |
| --- | --- |
| 1. Polypropylene Antimonypentoxide | 2–3.2 |
| 2. Polyolefin Aromatic Bromide | 10–15 |
| 3. Polyfin Antimony Pentoxide | 3–6 |
| 4. Ammonium Phosphate | 2.5–4.2 |
| 5. Monomer Silane A171 | 0.08–0.13 |
| 6. Benzoyl Peroxide 0.1% in Toluene | 0.08–0.13 |
| 7. Zinc Acrylate SR 633 | 0.008–0.014 |

For the polypropylene mixture, the first ingredient is available under the trade name Burnex -2000-10 and is preferably 2.4 parts by weight of the grafting mixture, but may be anywhere from 2.0 to 3.2 parts by weight The second ingredient, available under the trade name Thermoguard 9010 is preferably 12 parts by weight, but maybe anywhere from 10 to 15. The third ingredient, available under the trade name Thermoguard 82-18 is preferably 4 parts by weight, but may be 3 to 6 parts by weight. The fourth ingredient is the ammonium polyphosphate. It is available under the tradename Hostaflam AP 422, and is provided by Hoechst Celanese Corporation. However, those skilled in the art will appreciate that there are a number of sources of ammonium polyphosphate that are suitable in the present invention. It is preferably present as 3.20 parts by weight of the graft mixture, but may be anywhere from 2.5 to 4.2 parts by weight. The remaining three ingredients, Silane A171, benzoyl peroxide and zinc acrylate are the same as that found in the polyethelene mixture of Table 1.

As with the polyethylene graft mixture, the polypropylene graft mixture is mixed with 70–90 parts by weight polypropylene and is present as 10–30 parts by weight. The polypropylene graft mixture also reacts when the mixture is subjected to molding or extrusion. This similarly provides the advantage of not having to add a step to the polymer processing.

Figure 2:
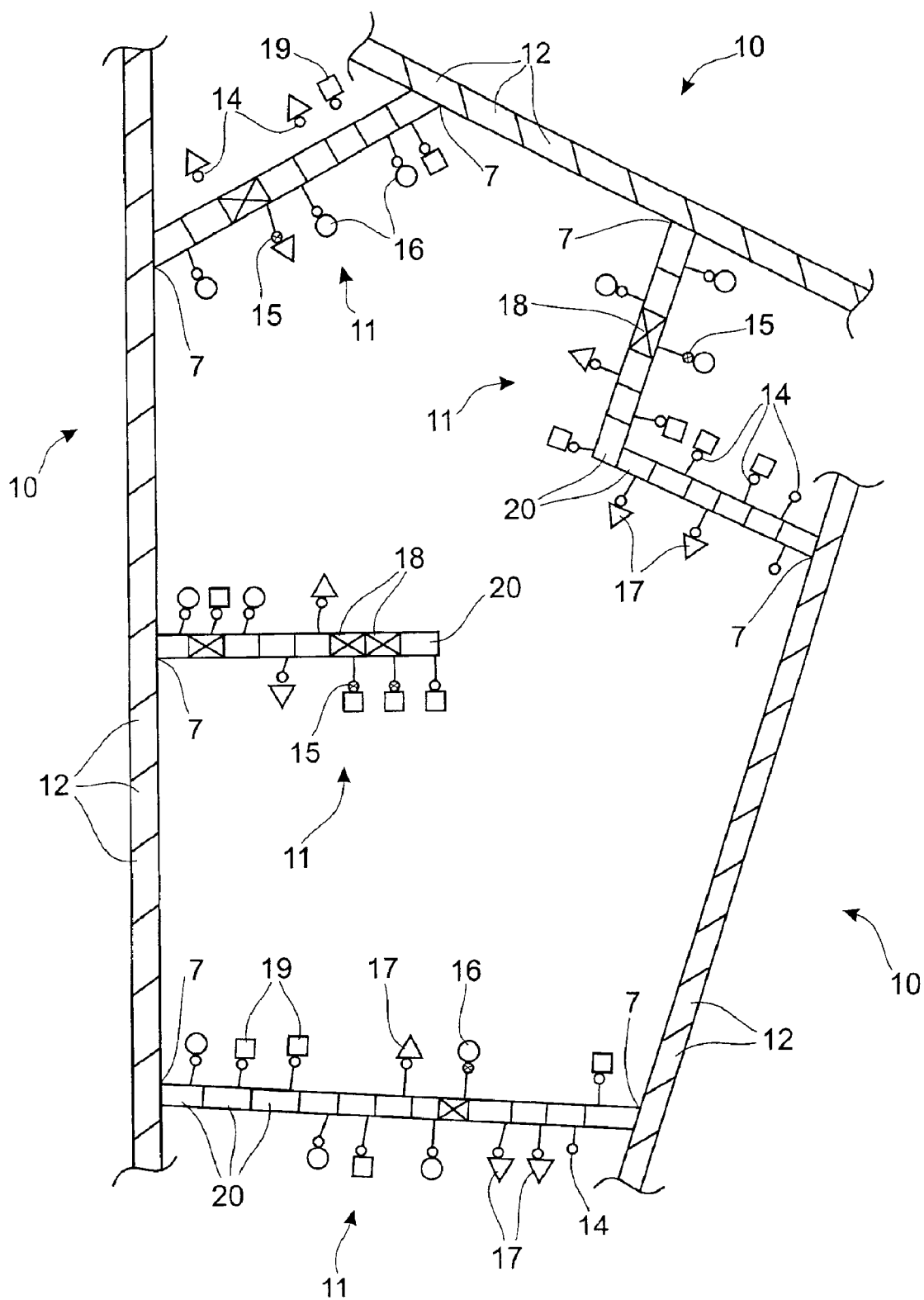
FIG. 2 is a diagrammatic illustration of the product resulting from the addition of a graft initiation mixture to a substrate polymer.

FIG. 2 is a diagrammatic illustration of the product resulting from the addition of a graft initiating mixture. Substrate polymers 10 are comprised of monomers 12. In this particular example, substrate polymers 10 are polypropylene and are comprised of propylene monomers 12. Graft polymers were initiated at initiation points 7. The initiation resulted from the release of an active hydrogen in the formation of a free radical, which then reacted with graft monomers 20 are vinylmethoxysilane which are depicted as circles and represent Silane monomers. Graft monomers 20 have functional groups 14 appended to them. In this particular embodiment, functional groups 14 are trimethoxysilane. Graft polymers 11 are comprised primarily of vinyl alcoxy silanes 20. However, acrylate monomers 18 are also incorporated into graft polymers 11. Acrylate monomers 18 have carboxyl groups 15 attached to them. Functional groups 14 and 15 are utilized to chemically bond flame retardant compounds to graft polymers 11. Graft polymers 11 may be attached to only one substrate 10, or may cross-link substrate polymers 10.

Antimony pentoxide 16 is a flame retardant compound that may be chemically bound to functional groups 14 or 15. Similarly, brominated compound 17 and amonium polyphosphate 19 are also chemically bound to functional groups 14 and 15. Not every functional group is necessarily bound to a flame retardant or abrasion resistant compound.

Both the graft polymerization of monomers 20 and 18 and the covalent binding of additives 16, 17 and 19 to functional groups 14 and 15 are induced by the heat applied to the mixture during extrusion. The resulting material has superior mechanical, physical, flame retardant and abrasion resistant properties. The chemicals added to the substrate polymer may not be leached out.

Although these mixtures may be applied to a wide variety of applications, it is foreseen that these mixtures of polyethylene and polypropylene having increased flame retardancy and abrasion resistance are especially well suited for the making of plastic pallets for use in the transportation of goods by means of forklifts and other load transfer devices.

Whereas, the present invention has been described in relation to the drawings attached hereto, it should be understood that other and further modifications, apart from those shown or suggested herein, may be made within the spirit and scope of this invention.

What is claimed is:

1. An improved flame retardent composition comprising:
   70–90 parts by weight, at least one polyolefin and,
   10–30 parts by weight, a flame retardent graft polymer covalently bound to said polyolefin,
   wherein said at least one graft polymer comprises a mixture of vinyltriethoxysilane and vinyltrimethoxysilane.

* * * * *